(12) United States Patent
Galil et al.

(10) Patent No.: US 9,734,343 B2
(45) Date of Patent: Aug. 15, 2017

(54) DETECTION AND PREVENTION OF SENSITIVE INFORMATION LEAKS

(71) Applicant: International Business Machines Corporation, Armonk, NY (US)

(72) Inventors: Guy Galil, Jerusalem (IL); Leonid Gorelik, Petah Tikva (IL); Alexander Pyasik, Maaleh-Adumim (IL); Oded Sofer, Midreshet Ben Gurion (IL); Yifat Yulevich, Bazra (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 14/546,422

(22) Filed: Nov. 18, 2014

(65) Prior Publication Data

US 2015/0242639 A1    Aug. 27, 2015

Related U.S. Application Data

(63) Continuation of application No. 14/190,569, filed on Feb. 26, 2014.

(51) Int. Cl.
*G06F 21/60* (2013.01)
*G06F 21/55* (2013.01)
*G06F 21/62* (2013.01)

(52) U.S. Cl.
CPC ............ *G06F 21/60* (2013.01); *G06F 21/552* (2013.01); *G06F 21/6245* (2013.01)

(58) Field of Classification Search
CPC .......... G06F 21/00; G06F 21/50; G06F 21/55; G06F 21/554; G06F 21/60;
(Continued)

(56) References Cited

U.S. PATENT DOCUMENTS 8,141,127 B1 * 3/2012 Mustafa ............ G06F 17/30943
726/1
8,272,051 B1 * 9/2012 Zhao ................... H04L 63/0245
713/153
(Continued)

FOREIGN PATENT DOCUMENTS

CN        101827102 A      9/2010
IL    WO2006/137057    * 12/2006   ............ G06F 21/24
(Continued)

OTHER PUBLICATIONS

Auer, Peter et al., "The Nonstochastic Multiarmed Bandit Problem", Journal SIAM Journal on Computing, vol. 32, Issue 1, 2003, 33 pages.
(Continued)

*Primary Examiner* — Jung Kim
*Assistant Examiner* — Adrian Stoica
(74) *Attorney, Agent, or Firm* — Cantor Colburn LLP

(57) ABSTRACT

Examples of techniques for detecting and preventing sensitive information leaks are described herein. In one example, a method for detection of sensitive information leaks includes computing, via a processor, a set of rules that identify sensitive information, and sending, via the processor, the set of rules to a dispatcher application using a protocol. The method can also include detecting, via the processor, that at least one data block of the transmitted data matches the set of rules, and executing, via the processor, a corrective action in response to detecting that at least one of the transmitted data blocks matches the set of rules.

13 Claims, 4 Drawing Sheets

(58) Field of Classification Search
CPC ............. G06F 21/6218; G06F 21/6245; G06F 21/6254; G06F 21/6263; G06F 21/552; H04L 63/00; H04L 63/02; H04L 63/0227; H04L 63/0236; H04L 63/0245; H04L 63/0281; H04L 63/14; H04L 63/1408; H04L 63/1416; H04L 63/1441; H04L 63/1475; H04L 63/1483; H04W 12/00; H04W 12/02; H04W 12/08; H04W 12/12

See application file for complete search history.

(56) References Cited

U.S. PATENT DOCUMENTS

| | | | | |
|---|---|---|---|---|
| 8,321,560 | B1* | 11/2012 | Pai ..................... | G06F 11/0793 709/224 |
| 8,407,766 | B1 | 3/2013 | Newstadt et al. | |
| 8,572,758 | B1* | 10/2013 | Clifford .............. | G06F 21/6218 707/741 |
| 8,826,443 | B1* | 9/2014 | Raman ................. | G06F 11/004 726/26 |
| 8,949,371 | B1* | 2/2015 | Shrowty ............. | G06F 21/6218 709/217 |
| 2007/0033149 | A1* | 2/2007 | Kanngard ............... | G06F 21/31 705/65 |
| 2009/0119745 | A1* | 5/2009 | Chung ................ | G06F 21/6263 726/1 |
| 2009/0158430 | A1* | 6/2009 | Borders ................ | G06F 21/552 726/23 |
| 2009/0300751 | A1* | 12/2009 | Krishnamurthy ... | H04L 63/0227 726/13 |
| 2010/0024037 | A1* | 1/2010 | Grzymala-Busse | G06F 21/6245 726/26 |
| 2010/0250514 | A1* | 9/2010 | Palmer ............. | G06F 17/30864 707/706 |
| 2011/0035294 | A1* | 2/2011 | Mizrah ................... | G06F 21/33 705/26.42 |
| 2011/0225659 | A1* | 9/2011 | Isaacson ............... | G06F 21/604 726/28 |
| 2012/0042361 | A1* | 2/2012 | Wong ..................... | G06F 21/12 726/4 |
| 2013/0254883 | A1 | 9/2013 | Troyansky et al. | |
| 2015/0242633 | A1 | 8/2015 | Galil et al. | |

FOREIGN PATENT DOCUMENTS

| | | |
|---|---|---|
| WO | 2010011179 A1 | 1/2010 |
| WO | 2012057737 A1 | 5/2012 |
| WO | 2012109533 | 8/2012 |

OTHER PUBLICATIONS

Google.com search "sensitive data leaks", https://www.google.com/search?hl=iw&site=&tbm=pts&source=hp&q=sensitive+data+leaks+&oq=sensitive+data+leaks+&gs_1=hp.3 . . .1370.1370.0.267&cad=b&cad=cbv&sei=rxwOU8720lbo0QHH-YGoBg, accessed Feb. 26, 2014, 2 pages.

Liu et al., "SIDD: A framework for detecting sensitive data exfiltration by an insider attack", HICSS '09. 42nd Hawaii International Conference on System Sciences, Jan. 2009, 10 pages.

MyDLP, "MyDLP Enterprise Edition Data Leak Prevention", www.MyDLP.com, 2013, 2 pages.

Papadimitriou et al., "A Model for Data Leakage Detection", 25th International Conference on Data Engineering, Mar. 2009, China, 4 pages.

Shu et al., "Poster: high performance data leak detection", IEEE Security poster, 2013.Can be found at : http://www.ieee-security.org/TC/SP2013/posters/Xiaokui_Shu.pdf, 2 pages.

Shu, Xiaokui, and Yao, Danfeng, "Data Leak Detection As a Service: Challenges and Solutions", Technical Report TR-12-10, Computer Science, Virginia Tech, Mar. 2012, 12 pages.

The Exchange Team, "Introducing data loss prevention in the new exchange.", Blog post from Sep. 2012. 1 page. Can be found at: http://blogs.technet.com/b/exchange/archive/2012/09/28/introducing-data-loss-prevention-in-thenew-exchange.aspx, 4 pages.

* cited by examiner

DETECTION AND PREVENTION OF SENSITIVE INFORMATION LEAKS

DOMESTIC PRIORITY

This application is a continuation of U.S. patent application Ser. No. 14/190,569, filed Feb. 26, 2014, the content of which is incorporated by reference here in its entirety.

BACKGROUND

The present disclosure relates to monitoring transmitted data, and more specifically, but not exclusively, to monitoring transmitted data for sensitive information.

SUMMARY

According to an embodiment described herein, a method for detecting and preventing sensitive information leaks include computing, via a processor, a set of rules that identify sensitive information and sending, via the processor, the set of rules to a dispatcher application using a protocol. The method also includes detecting, via the processor, that at least one data block of the transmitted data matches the set of rules. Furthermore, the method includes executing, via the processor, a corrective action in response to detecting that at least one of the transmitted data blocks matches the set of rules.

According to another embodiment described herein, a computer program product for detecting and preventing sensitive information leaks is provided. The computer program product includes a computer readable storage medium having program code embodied therewith, the program code executable by a processing circuit to perform a method. The method includes computing, via the processing circuit, a set of rules that identify sensitive information. The method also includes sending, via the processing circuit, the set of rules to a dispatcher application using a protocol and detecting, via the processing circuit, that at least one data block of the transmitted data matches the set of rules. Furthermore, the method includes executing, via the processing circuit, a corrective action in response to detecting that at least one of the transmitted data blocks matches the set of rules.

DETAILED DESCRIPTION

According to embodiments of the present disclosure, a computing device monitors transmitted data for sensitive information. In some examples, a computing device detects when transmitted data includes sensitive information retrieved from a database, or any suitable computing device. The sensitive information may include passwords, medical information, credit card numbers, social security numbers, addresses, birthdates, government or private organization confidential information, and the like. In some embodiments, a computing device filters the transmitted data based on predetermined rules, regular expressions, and algorithms. A rule, as referred to herein, may include any suitable logical or semantic expression that identifies data based on predetermined information. In some examples, the computing device uses the rules to detect patterns of sensitive information being transmitted or leaked to external computing devices. A sensitive information leak may include the transmission of any sensitive information to an unauthorized computing device or user.

Figure 1:
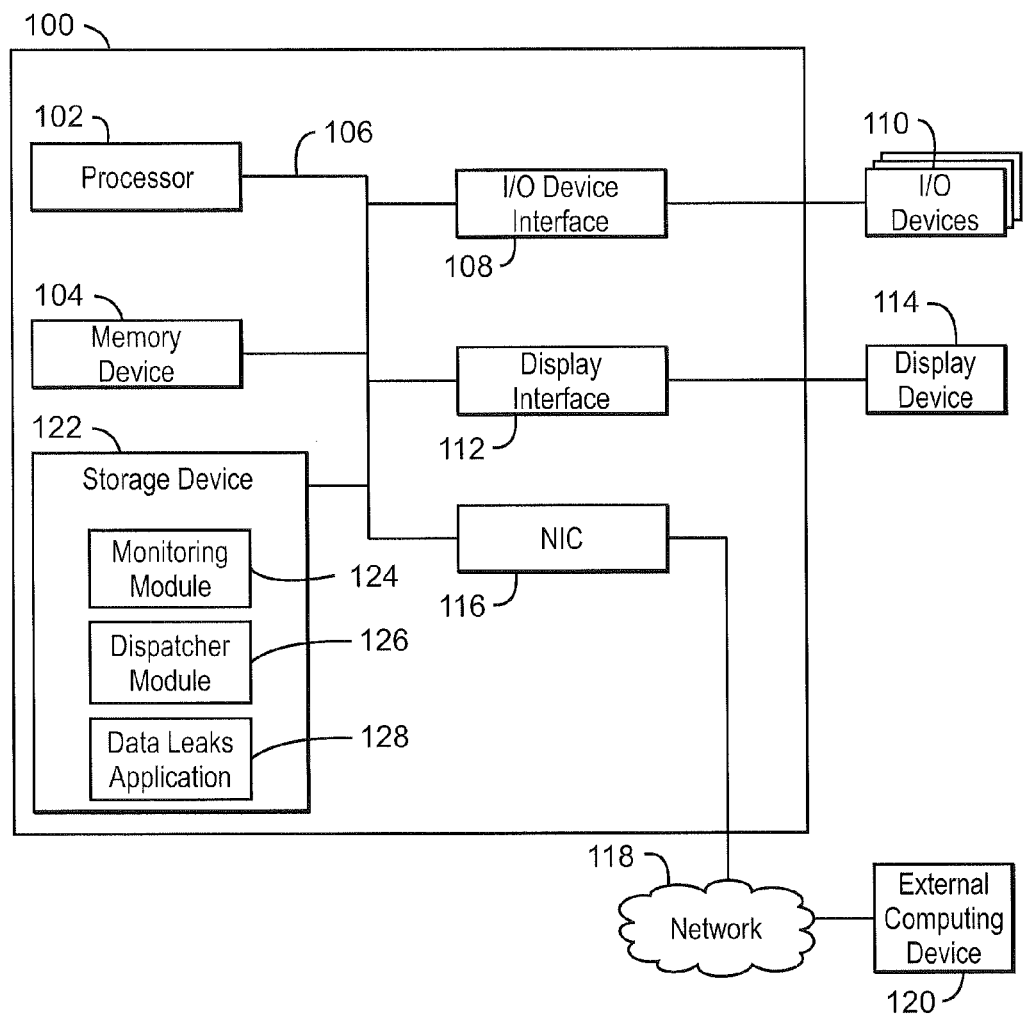
FIG. 1 depicts a block diagram of an example of a computing device for monitoring transmitted data in accordance with some embodiments.

FIG. 1 is an example of a computing device for monitoring transmitted data. The computing device 100 may be for example, a desktop computer, laptop computer, tablet computer, or smartphone. The computing device 100 may include a processor 102 that is adapted to execute stored instructions and a memory device 104 for storing the instructions. The processor may be a single-core processor, multi-core processor, computing cluster, or any number of other configurations. The memory 104 may include random access memory (RAM), read only memory, flash memory, or any other suitable memory systems. The instructions executed by the processor 102 may be used to implement a method that monitors transmitted data.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (also referred to herein as a NIC) 116 may be adapted to connect the computing device 100 through the system interconnect 106 to a network 118. In some embodiments, the NIC 116 transmits data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118.

The processor 102 may also be linked through the system interconnect 106 to a storage device 122 that can include a hard drive, an optical drive, a USB flash drive, an array of drives, or any combinations thereof. In some examples, the storage device 122 can include a monitoring module 124, a dispatcher module 126, and a data leaks application 128. In some embodiments, the monitoring module 124 identifies rules, regular expressions, algorithms, or any combination thereof that can detect sensitive data such as social security numbers, credit card numbers, government or private organization confidential information and the like. In some examples, the monitoring module 124 sends the rules, regular expressions, and algorithms to the dispatcher module 126 using any suitable protocol. A protocol may allow the monitoring module 124 to transmit any suitable number of attributes that can detect sensitive data to the dispatcher module 126. In some embodiments, the protocol may include attributes that identify a client internet protocol address, an event time that indicates the time during which sensitive data is accessed, and the like. The protocol is described in greater detail below in relation to FIG. 3.

In some embodiments, the dispatcher module 126 detects the rules, regular expressions, and algorithms from the monitoring module 124 using a protocol. The dispatcher module 126 may determine if a data leaks application 128 with the rules, regular expressions, and algorithms received from the monitoring module 124 has already been created. In some embodiments, the dispatcher module 126 creates a new data leaks application 128 based on the received rules, regular expressions, and algorithms. In some examples, the dispatcher module 126 also updates existing data leaks applications 128 to detect sensitive data using the received rules, regular expressions, and algorithms.

In some embodiments, the data leaks application 128 filters streaming data and detects sensitive data in the streaming data. For example, the data leaks application 128 monitors data transmitted through any suitable system interconnect 106, or any other suitable hardware component or software application, and the data leaks application 128 identifies sensitive data in the transmission using the rules, regular expressions, and detection algorithms received from the monitoring application 124. The data leaks application is explained in greater detail below in relation to FIG. 2.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the monitoring module 124, dispatcher module 126, and data leaks application 128 may be partially, or entirely, implemented in hardware and/or in the processor 102. For example, the functionality may be implemented with an application specific integrated circuit, or in logic implemented in the processor 102, among others.

Figure 2:
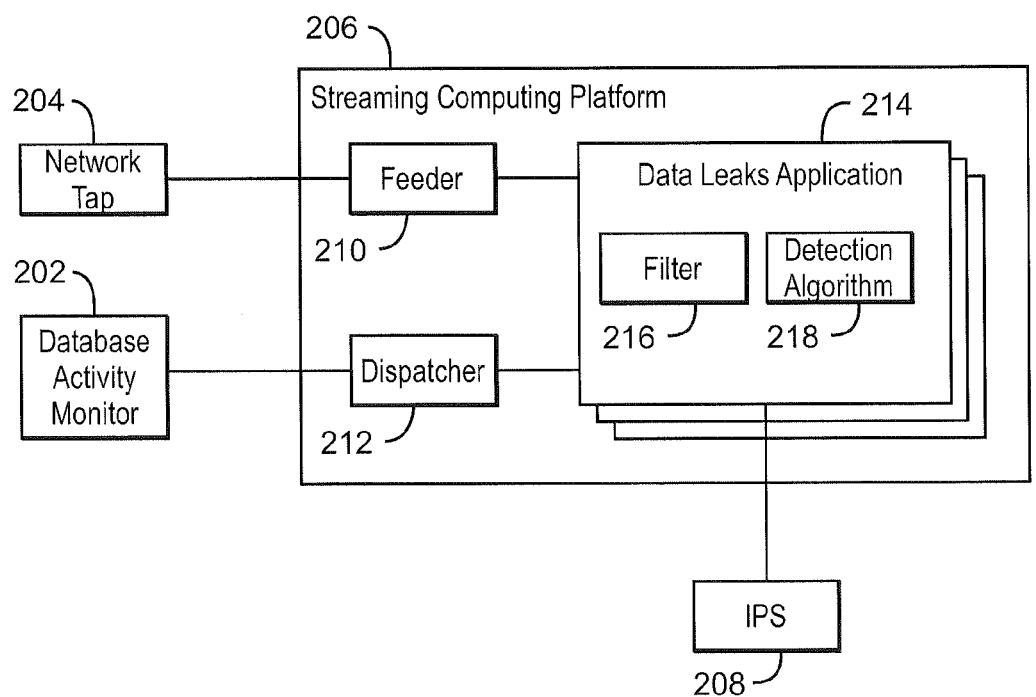
FIG. 2 depicts a block diagram of a system for monitoring transmitted data in accordance with some embodiments.

FIG. 2 is a block diagram of an example system for monitoring transmitted data. In some embodiments, the system 200 includes a database activity monitor 202, a network tap 204, a stream computing platform 206, and an intrusion prevention system (also referred to herein as IPS) 208. The database activity monitor 202 may identify and classify sensitive data sources, objects and data patterns. For example, the database activity monitor 202 may identify regular expressions, rules, and algorithms (also referred to herein as event information) that identify sensitive information in transmitted data. The monitoring application 202 may transfer the event information to a stream computing platform 206 by using any suitable protocol.

In some embodiments, the stream computing platform 206 includes feeder logic 210, a dispatcher 212, and at least one data leaks application 214. The feeder logic 210 may receive streaming data from the network tap 204 and forward the streaming data to the data leaks application 214. In some embodiments, the feeder logic 210 receives streaming data from any suitable number of network taps 204. For example, the feeder logic 210 may receive streaming data from any suitable number of computing devices, or point of sale devices, among others.

In some embodiments, the dispatcher 212 generates new data leaks applications 214 and update data leaks applications 214. For example, the dispatcher 212 may receive event information from the database activity monitor 202 that includes a set of rules to identify sensitive information. The dispatcher 212 may determine that an existing data leaks application 214 uses a different second set of rules to identify sensitive information. The dispatcher 212 may generate a new data leaks application 212 based on the received set of rules. In some embodiments, the dispatcher 212 generates any suitable number of data leaks applications 214 to detect sensitive information. The dispatcher 212 may also populate predefined templates with event specific parameters. A template, as referred to herein, may include any suitable number of attributes associated with transmitted data. The attributes may include the internet protocol (also referred to herein as IP) address of a client, the protocol used to transmit the data, the time of the data transmission, and the like. In some embodiments, the dispatcher 212 detects any suitable number of attributes for each data transmission. In some embodiments, the dispatcher 212 sends the attributes in a template along with transmitted data to a data leaks application 214.

In some embodiments, the data leaks application 214 includes a filter 216 and a detection algorithm 218 that detect sensitive data from the streaming data. For example, the data leaks application 214 may use the filter 216 to determine that transmitted data from particular ranges of IP addresses, or data transmitted with particular protocols are not to be monitored. In some embodiments, the filter includes a regular expression, an algorithm, algorithm parameters or any combination thereof. In some examples, the detection algorithm may be any suitable algorithm that detects patterns in a parallel computing environment. For example, the Rabin-Karp algorithm, among others, can be used as a detection algorithm to detect patterns within any suitable number of data leaks applications 214 being executed simultaneously on a stream computing platform 206. The data leaks application 214 may use the detection algorithm 218 to detect keywords and other attributes in transmitted data that are to be monitored. In some examples, the detection algorithm 218 includes any suitable regular expression, algorithm, or combination thereof. The regular expressions are described in greater detail below in relation to FIG. 3. The data leaks application 214 may also send the sensitive information identified in transmitted data to the IPS 208. The data leaks application 214 may also send a regular expression that can detect additional sensitive information leaks to the IPS 208. In some embodiments, the IPS 208 proactively blocks transmitted data in a data stream that matches the regular expression received from the data leaks application 214, which can prevent sensitive information leaks.

It is to be understood that FIG. 2 is not intended to indicate that the system 200 is to include all of the components shown in FIG. 2. Rather, the system 200 can include fewer or additional components not illustrated in FIG. 2 (e.g., additional memory components, embedded controllers, additional modules, additional network interfaces, etc.).

Figure 3:
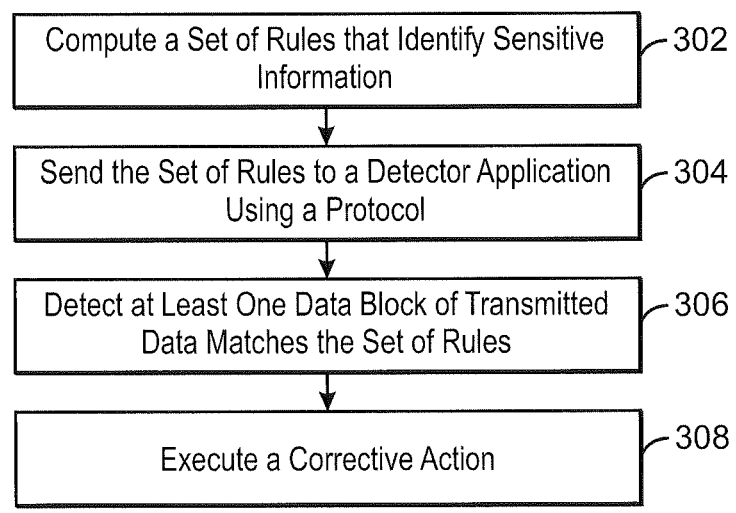
FIG. 3 depicts a process flow diagram of an example method for monitoring transmitted data in accordance with some embodiments.

FIG. 3 is an example of a method for monitoring transmitted data. The method 300 may be implemented with any suitable computing device, such as the computing device 100 of FIG. 1.

At block 302, the monitoring module 124 may compute a set of rules that identify sensitive information. As discussed above, the set of rules may include any suitable number of regular expressions, algorithms, and the like, which identify sensitive information. In some examples, the regular expressions in the set of rules indicate patterns of transmitted data that match sensitive data. For example, a number of numerical digits separated by dashes may correspond to social security numbers, credit card numbers, phone numbers, postal codes, or birth dates, etc. In some examples, the regular expression "[0-9]{3}-[0-9]{2}-[0-9]{4}" may indicate that the sensitive data corresponds to three numerical values followed by a dash and two numerical values followed by a dash, which is followed by four numerical values. In other examples, the regular expressions may identify sensitive data based on any suitable pattern of numeric and/or alphanumeric characters.

At block 304, the monitoring module 124 may send the set of rules to a dispatcher module 126 using a protocol. In some embodiments, the protocol indicates an origin system and security event information. The origin system may indicate the monitoring application that identified the rules to detect sensitive information. For example, a dispatcher module 126 may receive sets of rules to detect sensitive information from multiple monitoring modules 124 in separate computing devices. In some embodiments, the protocol includes an origin system identifier that indicates the monitoring module 124 that provided a set of rules to identify sensitive information.

In some embodiments, the protocol also includes security event information, which may include any suitable set of rules or regular expressions, among others, that identify sensitive information. For example, the security event information may include metadata with attributes. The attributes may include a client or end-point internet protocol address that corresponds to the IP address of the client initiated suspicious DB transaction. The attributes may also include an identifier that corresponds to the process that initiated a transaction that includes sensitive data. In some embodiments, the attributes also include a user identifier associated with the user that initiated the transmission of the sensitive data. The attributes may also include the transport protocol used to transmit the sensitive data and a timestamp associated with the transmission time for the sensitive data.

In some embodiments, the protocol also includes an identifier that indicates an algorithm that is to be applied for detecting sensitive data. For example, the protocol may include any suitable algorithm that can retrieve data from a data transmission. In some embodiments, the algorithms include any suitable text mining technique like UIMA for real-time content analytics, among others. In some embodiments, the protocol also includes detection parameters that provide name-value pairs populated with the detection algorithm parameters. For example, the detection parameters may include keywords, ranges of internet protocol addresses, types of data transmissions to monitor, etc. In some embodiments, the protocol enables the transmission of security event information between at least two computing devices.

At block 306, the dispatcher module 126 may detect that at least one data block of the transmitted data matches the set of rules. For example, the dispatcher module 126 may filter transmitted data based on a type of data transmission or source IP address, among others. In some embodiments, the dispatcher module 126 also uses the security event information to detect sensitive data in the transmitted data that is not filtered. For example, the dispatcher module 126 may use keywords or regular expressions, among others, to identify sensitive information included in the transmitted data. In some embodiments, the dispatcher module 126 detects sensitive data based on any suitable algorithm, such as the Luhn algorithm, or by metadata associated with transmitted data. For example, metadata may indicate that transmitted data that originates from a portion of a table or database includes sensitive information.

At block 308, the dispatcher module 126 may execute a corrective action in response to detecting that at least one of the transmitted data blocks matches the set of rules. In some embodiments, the corrective action includes preventing the transmitted data from being sent to an external computing device. The corrective action may also include sending an alert to any suitable application, computing device, or user, wherein the alert indicates the transmission of sensitive information.

The process flow diagram of FIG. 3 is not intended to indicate that the operations of the method 300 are to be executed in any particular order, or that all of the operations of the method 300 are to be included in every case. Additionally, the method 300 may include any suitable number of additional operations. For example, the dispatcher module 126 may also generate a second data leaks application with a stream computing platform, wherein the data leaks application comprising a filter that determines a portion of the transmitted data to monitor for sensitive information based on the security event information. The dispatcher module 126 may also execute the second data leaks application to identify transmitted data that includes sensitive information. In some embodiments, the dispatcher module 126 also detects a second filter and a detection algorithm for the identification of sensitive information, detects that a data leaks application is to be updated based on the second filter and the detection algorithm, and updates the data leaks application to identify sensitive information with the second filter and the detection algorithm. As discussed above, the detection algorithm may include any suitable set of rules, regular expressions, or algorithms, among others, that can identify sensitive information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
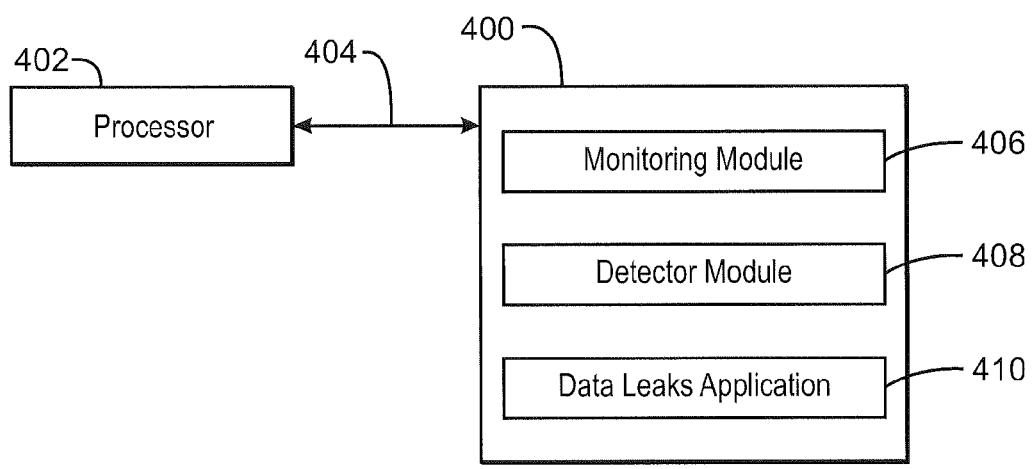
FIG. 4 depicts a tangible, non-transitory computer-readable medium for monitoring transmitted data in accordance with some embodiments.

Referring now to FIG. 4, a block diagram is depicted of an example of a tangible, non-transitory computer-readable medium that can monitor transmitted data. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a monitoring module 406 may identify rules, regular expressions, and algorithms that can detect sensitive data. In some embodiments, a detector module 408 can create data leaks applications 410 based on the rules, regular expressions, an algorithms identified by the monitoring module 406. In some examples, the data leaks applications 410 can detect sensitive data included in data transmissions. It is to be understood that any number of additional software components not shown in FIG. 4 may be included within the tangible, non-transitory, computer-readable medium 400, depending on the specific application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detection and prevention of sensitive information leaks, comprising:

identifying an event of one or more data blocks in a predetermined secure portion of a database being accessed by a device;

computing, via a processor, a first set of rules to identify sensitive information in the one or more data blocks that are accessed by the device and executing a first data leaks application based on the first set of rules that identify the sensitive information using one or more predetermined patterns, and wherein the sensitive information includes transaction data from a source point of sale device;

sending, via the processor, the first set of rules and event-specific parameters to a dispatcher application, wherein the event-specific parameters identify the event of the one or more data blocks being accessed by comprising an identifier of the source point of sale device, an identifier of a transport protocol being used for transmitting the one or more data blocks by the device, an identifier of a process that is transmitting the one or more data blocks, an identifier of a user that is transmitting the one or more data blocks, and a time-stamp associated with the access of the one or more data blocks;

detecting, via the processor, that at least one data block from the data blocks is being transmitted based on the event-specific parameters; and in response to the first data leaks application being unable to identify the sensitive information from the at least one data block being transmitted, generating, via the processor, a second data leaks application by populating a predefined template with the event-specific parameters, and sending the template to the second data leaks application, wherein the second data leaks application executes based on a second set of rules, distinct from the first data leaks application.

2. The method of claim 1, executing a corrective action in response to detecting that the at least one data block matches the second set of rules of the second data leaks application, wherein the corrective action comprises preventing the at least one data block from being sent to an external computing device.

3. The method of claim 1, wherein the first se of rules and the event-specific parameters are sent using a predetermined protocol.

4. The method of claim 3,
wherein the second data leaks application is generated with a stream computing platform, the second data leaks application comprising a second filter, distinct from a first filter of the first data leaks application, and wherein a filter determines a portion of the transmitted data to monitor for sensitive information based on the event-specific parameters.

5. The method of claim 1, comprising:
detecting a filter and a detection algorithm for the identification of the sensitive information;
detecting that the first data leaks application is to be updated based on the filter and the detection algorithm; and
updating the first data leaks application to identify the sensitive information with the filter and the detection algorithm.

6. The method of claim 3, wherein the predetermined protocol enables the transmission of the event-specific parameters between at least two computing devices.

7. The method of claim of claim 4, wherein the filter comprises a regular expression, an algorithm, algorithm parameters or any combination thereof.

8. The method of claim 1, wherein the protocol event-specific parameters further include an identifier of a transaction associated with the sensitive information.

9. The method of claim 8, wherein the event-specific parameters further include an identifier of a user associated with the transaction corresponding to the sensitive information.

10. A computer program product for detection and prevention of sensitive information, the computer program product comprising a computer readable storage medium having program code embodied therewith, the program code executable by a processing circuit to perform a method comprising:

identifying an event of one or more data blocks in a predetermined secure portion of a database being accessed by a device;

computing, via the processing circuit, a first set of rules to identify sensitive information in the one or more data blocks that are accessed by the device and executing a first data leaks application based on the first set of rules that identify the sensitive information using one or more predetermined patterns, and wherein the sensitive information includes transaction data from a source point of sale device;

sending, via the processing circuit, the first set of rules and event-specific parameters to a dispatcher application, wherein the event-specific parameters identify the event of the one or more data blocks being accessed by comprising an identifier of the source point of sale device, an identifier of a transport protocol being used for transmitting the one or more data blocks by the device, an identifier of a process that is transmitting the one or more data blocks, an identifier of a user that is transmitting the one or more data blocks, and a time-stamp associated with the access of the one or more data blocks;

detecting, via the processing circuit, that at least one data block from the data blocks is being transmitted based on the event-specific parameters; and upon detecting that the first data leaks application is unable to identify the sensitive information from the at least one data block being transmitted, generating, via the processing circuit, a second data leaks application by populating a predefined template with the event-specific parameters, and sending the template to the second data leaks application, wherein the second data leaks application executes based on a second set of rules, distinct from the first data leaks application.

11. The computer program product of claim 10, executing a corrective action in response to detecting that the at least one data block matches the second set of rules of the second data leaks application, wherein the corrective action comprises preventing the at least one data block from being sent to an external computing device.

12. The computer program product of claim 10, wherein the first set of rules and the event-specific parameters sent using a predetermined protocol.

13. The computer program product of claim 12, wherein generating the second data leaks application comprises generating a second filter that is distinct from a first filter of the first data leaks application, wherein a filter determines a portion of the transmitted data to monitor for sensitive information based on the event-speific parameters.

* * * * *